Figures 1, 2:
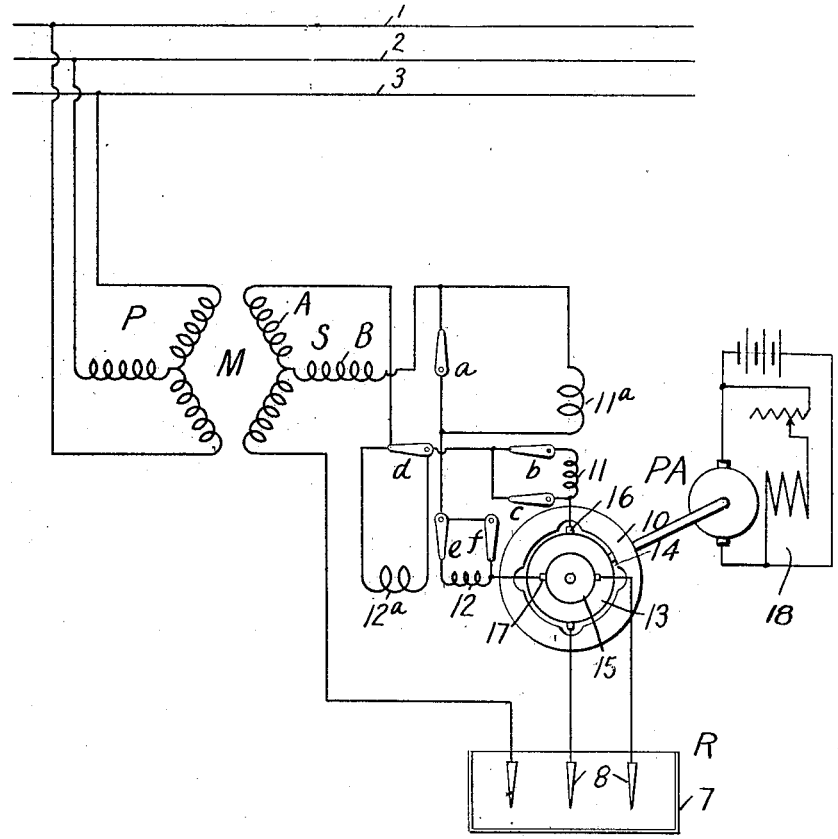

R. E. HELLMUND.
CONTROL SYSTEM.
APPLICATION FILED OCT. 7, 1915.

1,260,669.

Patented Mar. 26, 1918.

|  | a | b | c | d | e | f |
|---|---|---|---|---|---|---|
| Starting | O | O | O | O | O | O |
| Strong Field |  | O |  |  | O |  |
| Transition |  | O | O |  | O | O |
| Weak Field |  |  | O |  |  | O |

WITNESSES
Fred H. Miller
W. R. Coley

INVENTOR
Rudolf E Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,260,669.  Specification of Letters Patent.  Patented Mar. 26, 1918.

Application filed October 7, 1915. Serial No. 54,537.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to control systems for dynamo-electric machines, and it has special reference to systems of control embodying phase-advancing means for effecting power-factor corrections and adjustments of slip of polyphase induction motors.

One of the objects of my invention is to improve and simplify the arrangement of circuits and operation of systems of the above-indicated character and, particularly, to provide means whereby a phase advancer may be utilized both for decreasing the slip of an induction motor to be regulated and for improving the power factor thereof, while maintaining the size and cost of the phase advancer at a minimum.

More specifically, it is an object of my invention to provide a phase advancer of the type shown and described in my copending application, Serial No. 49,754, filed Sept. 9, 1915. In said copending application, I disclose a machine which is inserted in two leads of a three-phase system and which produces electromotive forces in said two leads of such phase as, when properly resolved, produce balanced wattless electromotive forces in all three phases of said system. In the machine of the present application, electromotive forces are produced in two mains of a three-phase system which may be resolved into balanced wattless electromotive forces in all phases of the system as described, and, furthermore, electromotive forces may be produced in two mains of a three-phase alternating-current system which may be resolved into balanced energy electromotive forces in all three phases of the system. Thus, if a machine of the type herein disclosed be inserted in the secondary circuit of an induction motor, said wattless electromotive forces may be varied to control the power factor of the induction motor and said energy electromotive forces may be independently varied to adjust the slip of the induction motor.

It is well known in the art that the amount of wattless current compensations which are required in a phase advancer are dependent upon the slip of the motor to be regulated and that the larger the slip thereof, the greater must be the compensation and the larger must be the size of the phase advancer. It is evident, therefore, that if the induction motor slip can be decreased, the phase advancer may be made correspondingly smaller.

I propose, therefore, to provide means for inducing a watt of power voltage into the phase advancer in addition to the wattless voltage and to introduce these voltages into the proper secondary windings of the induction motor whereby its slip is decreased and the necessary compensation for power-factor is diminished.

The development of power currents in the phase advancer of course tends to necessitate an increase in size but it is found within certain ranges that the increase in size requisite for inducing the power or watt voltage is less than the saving accomplished by reducing the slip and wattless voltage. Therefore, the desired end is accomplished.

Similar results have been secured heretofore, although at the expense of complications in circuit connections and difficulty in adjustments and, moreover, the systems of the prior art have been such that it has been impossible to employ a liquid rheostat of the usual type for governing the operation of the induction motor at the same time that the phase advancer is utilized for performing its intended functions.

According to my invention, however, I employ a phase advancer that is connected between the induction motor and its regulating rheostat and may be used concurrently with said rheostat. Moreover, the slip regulation of induction motor may be accomplished with facility and exactness by combining the action of the phase advancer and the regulating rheostat. The large and approximate changes in the slip are effected through adjustments of the field-magnet windings of the phase advancer, while the small and precise gradations or settings are effected through the regulating rheostat.

In the accompanying drawing, Figure 1 is a diagrammatic view of a system of control embodying my invention, and Fig. 2 is a chart showing the positions of the various switches of the system shown in Fig. 1, under different operating conditions.

Referring to the drawing, the system shown comprises a plurality of supply-circuit conductors 1, 2 and 3, a polyphase induction motor M having star-connected primary windings P and similar secondary windings S, a regulating resistor R for governing the operation of the motor M, a phase advancer PA that is adapted to be connected between the secondary windings S and rheostat R for effecting regulations in slip and compensations of power-factor, and a plurality of switches a, b, c, d, e, and f for adjusting the circuit connections of the phase advancer PA.

The motor M, although illustrated as star-connected, may be any suitably constructed polyphase induction motor, while the regulating rheostat R, which also forms no material part of my present invention, in so far as its specific structural details are concerned, may also take any convenient form, although I prefer to employ a liquid rheostat comprising a single electrolyte-containing tank 7 and a plurality of electrodes 8 that are adapted to be immersed therein for governing the acceleration of the motor M, in accordance with the usual practice.

The phase advancer PA is of the well-known Leblanc type and comprises a magnetizable field-magnet structure 10, a plurality of exciting windings 11 and 12 that are adapted to induce the correcting, wattless currents in the advancer, a plurality of exciting windings 11$^a$ and 12$^a$ for inducing certain power or watt voltages in the advancer, and an armature 13 having separate and independent armature windings that are severally connected to separate commutator cylinders 14 and 15 with which sets of brushes 16 and 17 coöperate.

The armature 13 is driven by a motor 18 or other suitable means, and the field-magnet windings 11 and 11$^a$ and 12 and 12$^a$ are disposed upon the field-magnet structure 10 in quadrature relation. The armature winding that is associated with the brushes 16 of the phase advancer PA is adapted to be connected to phase winding A of the motor M in series circuit with the wattless compensating winding 11 and the power correcting winding 12$^a$, while the armature winding that is connected to the set of brushes 17 is adapted to be connected to phase B of the motor M through the wattless compensating winding 12 and the power or watt winding 11$^a$.

The several switches a to f, inclusive, while shown as manually operated for the sake of simplicity, may be of any suitable type, being embodied in any common form of controller, or constituting unit switches of the electro-pneumatic or electro-magnetic type, the sequence of which is commonly governed by means of a master controller. By reason of the fact that these various forms of switches, together with means for controlling their operation in a predetermined sequence, are old and well-known in the art, it is deemed sufficient to merely illustrate the switches in the manner indicated and to designate their operation to meet the different operating conditions as shown in the chart of Fig. 2.

It is a well-known fact that, in the type of phase advancer illustrated, a relatively weak field excitation therefor is required under normal or full-load conditions of the induction motor to be regulated, while a relatively heavy field excitation is necessary therefor when the induction motor is operated under light load conditions; also, when a relatively low resistance is included in the secondary circuit of the induction motor, accompanied by relatively small slip, a light excitation of the phase advancer is required; while, in case a relatively heavy resistance is connected in the motor secondary circuit, accompanied by a large slip, a corresponding heavy field excitation for the phase advancer is necessary.

For starting purposes, it is desirable to employ a very weak field excitation or to eliminate the exciting field windings, entirely in order to obviate the sparking of the brushes that is incident to the high frequency developed in the motor secondary under starting conditions. Therefore, at starting, all of the field-magnet windings are short-circuited, as shown in Fig. 1 and as indicated in the chart of Fig. 2 under "Starting".

Assuming the circuit connections to be as illustrated, the motor M may be brought up to speed by gradually supplying electrolyte to the regulating rheostat R in the customary manner. The switches a and d are preferably opened as soon as the motor is up to speed in order to permit the field-magnet windings 11$^a$ and 12$^a$ to become active for the purpose of producing an excitation which shall induce power currents in the respective armature windings that are associated with the sets of brushes 16 and 17 of the phase advancer PA, which power energy, when supplied to the secondary windings S of the motor M, serves to effect reductions in the slip of the motor, whereby the compensating wattless current, otherwise required, is materially reduced.

If the load upon the motor M is relatively light, and the power factor is, therefore, correspondingly low, all of the switches, with the exception of switches b and e are opened, as indicated in Fig. 2 under "Strong field", whereby the field-magnet windings 11 and 12 are connected in series with their corresponding armature windings and, therefore, serve to augment the mutually induced fields thereof and to strengthen the field excitation, whereby the desired amount of compensation is effected.

In the event that substantially full load is carried by the motor M, under which conditions the slip is relatively high and less compensation is required, the switches $c$ and $f$ only need be closed, as shown in Fig. 2 under "Weak field". The changes from the "Strong field" position to the "Weak field" position, however, should be effected through a transition step which is indicated in Fig. 2, in which switches $b$, $c$, $e$ and $f$ are closed in order to prevent open-circuiting the phase advancer. With the switches $c$ and $f$ closed, the exciting field-magnet windings 11 and 12 are eliminated from circuit and, therefore, the wattless current developed in the armature windings is induced only by the fields that result from the mutual action of the respective armature windings upon each other. The excitation of the phase advancer, therefore, is relatively weak and meets the operating conditions imposed upon it.

It will be found most convenient to provide means whereby the switches $a$ and $d$, which govern the operation of the power or watt windings $11^a$ and $12^a$, may be controllable at the will of the operator and independent of the remaining switches, in order that suitable regulation of the motor slip may be effected at any time and under any conditions of operation without reference to the power-factor compensations.

It will be understood that the operation of the regulating rheostat R is also effective in changing the slip of the induction motor M, and, inasmuch as it may be undesirable to provide a number of adjustments of the phase advancer windings $11^a$ and $12^a$, it is still possible to secure reasonably exact settings or adjustments by combining the relatively fine gradations that may be secured through the regulating rheostat R with the larger changes that are effected through the power or watt windings of the phase advancer.

Although I have shown and described a system of control embodying more or less specific circuit connections, my invention is not restricted to the precise details disclosed, but may be embodied in modifications of the system which do not depart from the spirit and scope of my invention. I desire, therefore, that only such limitations shall be imposed as are indicated in the appended claims.

I claim as my invention:

1. The combination with a polyphase alternating-current system, of a dynamo-electric machine connected thereto, and driving means therefor, said dynamo-electric machine embodying means for the production of a wattless component of electromotive force in each phase of said system, by the production of electromotive forces in a portion only of the phases thereof and said dynamo-electric machine further embodying means for the production of an energy component of electromotive force in each phase of said system by the production of electromotive forces in a portion only of the phases thereof.

2. The combination with a polyphase alternating-current system, of a dynamo-electric machine connected thereto, and driving means therefor, said dynamo-electric machine embodying means for the production of a wattless component of electromotive force in each phase of said system by the production of electromotive forces in a portion only of the phases thereof and said dynamo-electric machine further embodying means for the production of an energy component of electromotive force in each phase of said system by the production of electromotive forces in the phases thereof which are the seat of said induced wattless electromotive forces.

3. The combination with a three-phase alternating-current system, of a dynamo-electric machine connected thereto and driving means therefor, said dynamo-electric machine embodying means for producing electromotive forces in two phases only of said system which may be resolved into component wattless electromotive forces in each phase of said system, said dynamo-electric machine further embodying means for producing electromotive forces in two phases only of said system which may be resolved into component energy electromotive forces in each phase of said system.

4. The combination with a three-phase alternating-current system, of a dynamo-electric machine connected thereto and driving means therefor, said dynamo-electric machine embodying means for producing electromotive forces in two phases only of said system which may be resolved into component wattless electromotive forces in each phase of said system, said dynamo-electric machine further embodying means for producing electromotive forces in the same phases of said system which may be resolved into component energy electromotive forces in each phase of said system.

5. The combination with a three phase alternating-current system, of a dynamo-electric machine of the commutator type provided with two brush sets mounted in electrical quadrature to each other and with two field windings electrically in line with each brush set, respectively, one main of said system traversing a field winding in line with each brush set and one of the brush sets and another main of said system traversing the remaining field windings and the remaining brush set, and driving means for said dynamo-electric machine, whereby electromotive forces are produced in said two mains which may be resolved into wattless electromotive forces in each phase of said system and whereby electromotive forces are further produced in said two mains which may be resolved into energy electromotive forces in each phase of said system.

6. The combination with a three-phase alternating-current system, of a dynamo-electric machine of the commutator type provided with two brush sets mounted in electrical quadrature to each other and with two field windings electrically in line with each brush set, respectively, one main of said system traversing a field winding in line with each brush set and one of the brush sets and another main of said system traversing the remaining field windings and the remaining brush set, driving means for said dynamo-electric machine, whereby electromotive forces are produced in said two mains which may be resolved into wattless electromotive forces in each phase of said system and whereby electromotive forces are further produced in said two mains which may be resolved into energy electromotive forces in each phase of said system, and means for individually short-circuiting each of said field windings, whereby the effect thereof may be eliminated.

In testimony whereof, I have hereunto subscribed my name this 30th day of Sept., 1915.

RUDOLF E. HELLMUND.